United States Patent
Hosaka et al.

[19]

[11] Patent Number: 6,091,855
[45] Date of Patent: Jul. 18, 2000

[54] METHOD AND APPARATUS FOR ENCODING SIGNAL METHOD AND APPARATUS FOR DECODING SIGNAL AND RECORDING MEDIUM

[75] Inventors: Kazuhisa Hosaka, Saitama; Yoichi Yagasaki, Kanagawa, both of Japan

[73] Assignee: Sony Corporation, Tokyo, Japan

[21] Appl. No.: 08/882,206

[22] Filed: Jun. 24, 1997

[30] Foreign Application Priority Data

Jul. 1, 1996 [JP] Japan ..................................... 8-171450

[51] Int. Cl.⁷ .............................. G06K 9/36; G06K 9/32; H04N 1/41
[52] U.S. Cl. .......................... 382/240; 382/238; 382/299; 358/428
[58] Field of Search ..................................... 382/238, 299, 382/300, 239, 248, 240; 348/441, 443, 445; 358/428, 525; 345/132

[56] References Cited

U.S. PATENT DOCUMENTS

5,048,111  9/1991  Jones et al. .............................. 382/248

*Primary Examiner*—Thomas D. Lee
*Assistant Examiner*—Wenpeng Chen
*Attorney, Agent, or Firm*—Frommer Lawerence & Haug, LLP.; William S. Frommer

[57] ABSTRACT

A method and an apparatus for encoding and decoding a signal are provided for predicting high-resolution data based on low-resolution data. The low-resolution data and the high-resolution data both contain a plurality of pixels. The encoding and decoding method includes the first step of encoding the low-resolution data, outputting the encoded low-resolution data, decoding the encoded low-resolution data, and outputting the decoded data, the second step of predicting the high-resolution data based on the decoded low-resolution data and generating the predicted high-resolution data by repetitively outputting the pixels of the low-resolution data, and the third step of encoding the high-resolution data based on the high-resolution data and the predicted high-resolution data and outputting the encoded high-resolution data. The encoding and decoding apparatus includes the first encoding unit for encoding the low-resolution data, outputting the encoded low-resolution data, decoding the encoded low-resolution data, and outputting the decoded low-resolution data, a generating unit for predicting the high-resolution data based on the decoded low-resolution data and generating the predicted high-resolution data by repetitively outputting the pixels of the low-resolution data; and a second encoding step for encoding the high-resolution data based on the high-resolution data and the predicted high-resolution data and outputting the encoded high-resolution data.

10 Claims, 12 Drawing Sheets

(PRIOR ART)

METHOD AND APPARATUS FOR ENCODING SIGNAL METHOD AND APPARATUS FOR DECODING SIGNAL AND RECORDING MEDIUM

BACKGROUND OF THE INVENTION

1. Field of the Invention

The present invention relates to a method for predicting and encoding a digital image on the assumption that an image signal is transmitted through the effect of a transmitting device provided with various kinds of transfer rates such as an analog phone line, a digital phone line, and a leased data transmission line and is recorded on a storage medium having various kinds of storage capacities such as a magnetic disk or a RAM.

2. Description of the Related Art

Figure 1:
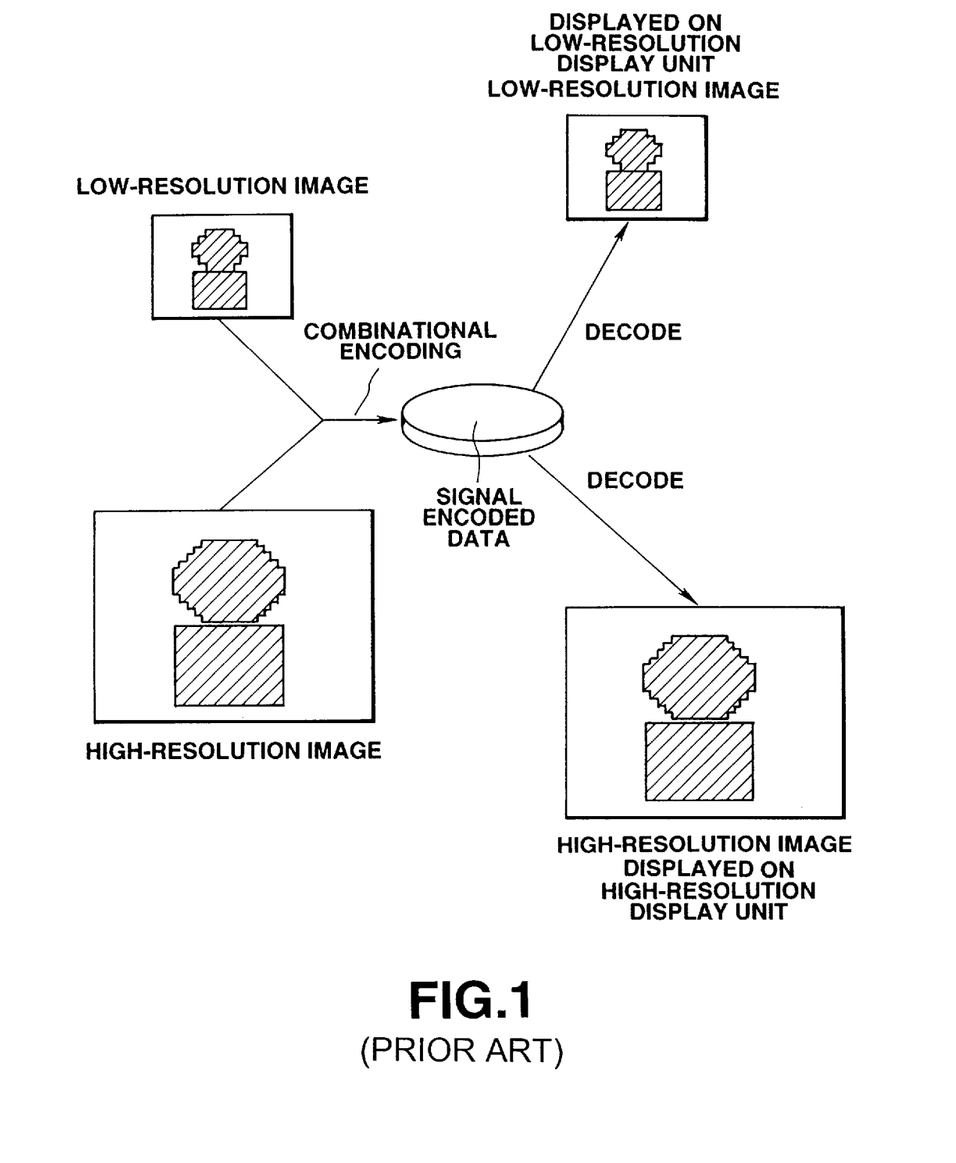
FIG. 1 is an explanatory view showing a way of use of image signals of one image at their own spatial resolutions.

In a case that a plurality of image signals corresponding to spatial resolutions are encoded into a single bit stream, as shown in FIG. 1, the use of only one bit stream advantageously makes it possible to correspond to the display units which have their own spatial resolutions only if the bit stream represents the same image.

Figure 2:
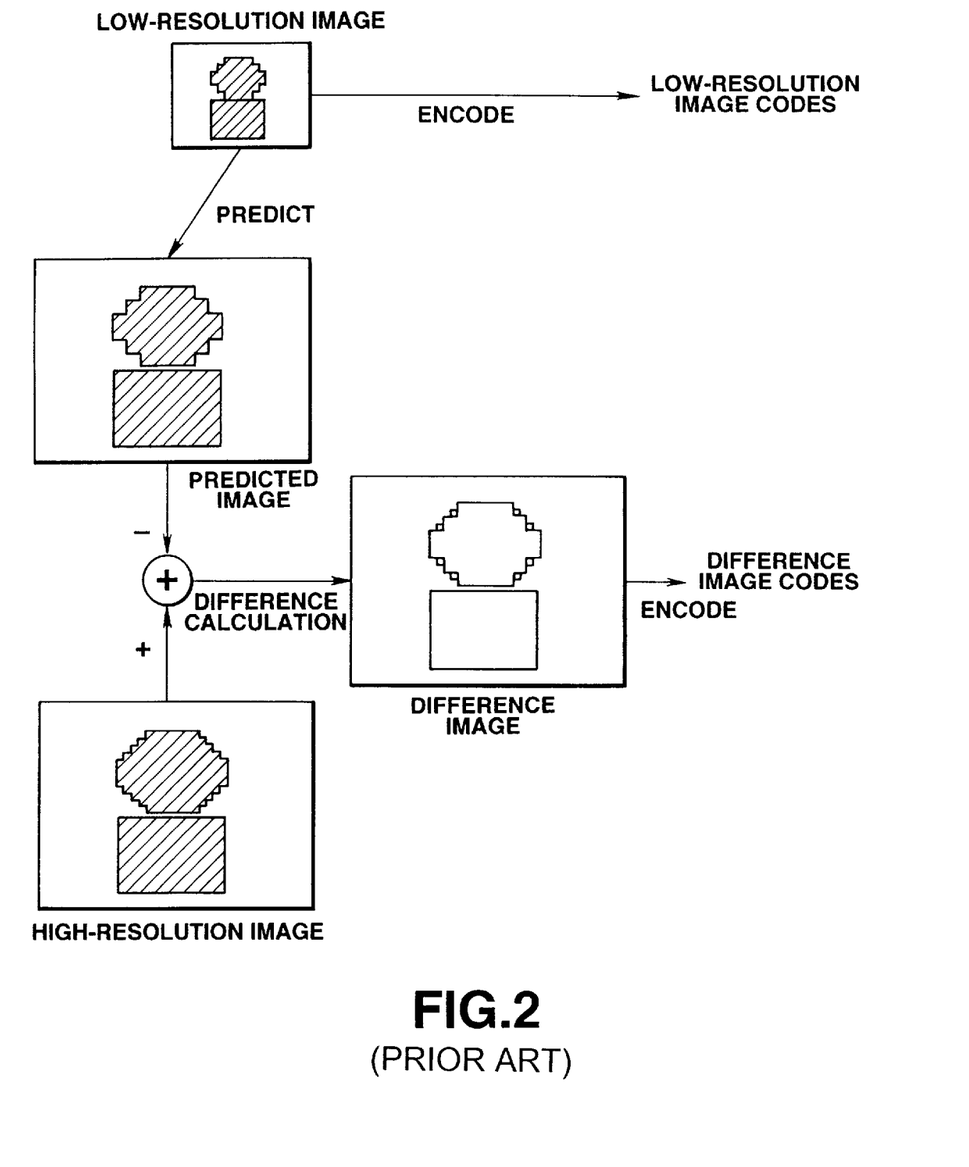
FIG. 2 is a view showing a method for encoding images of two resolutions.
Figure 3:
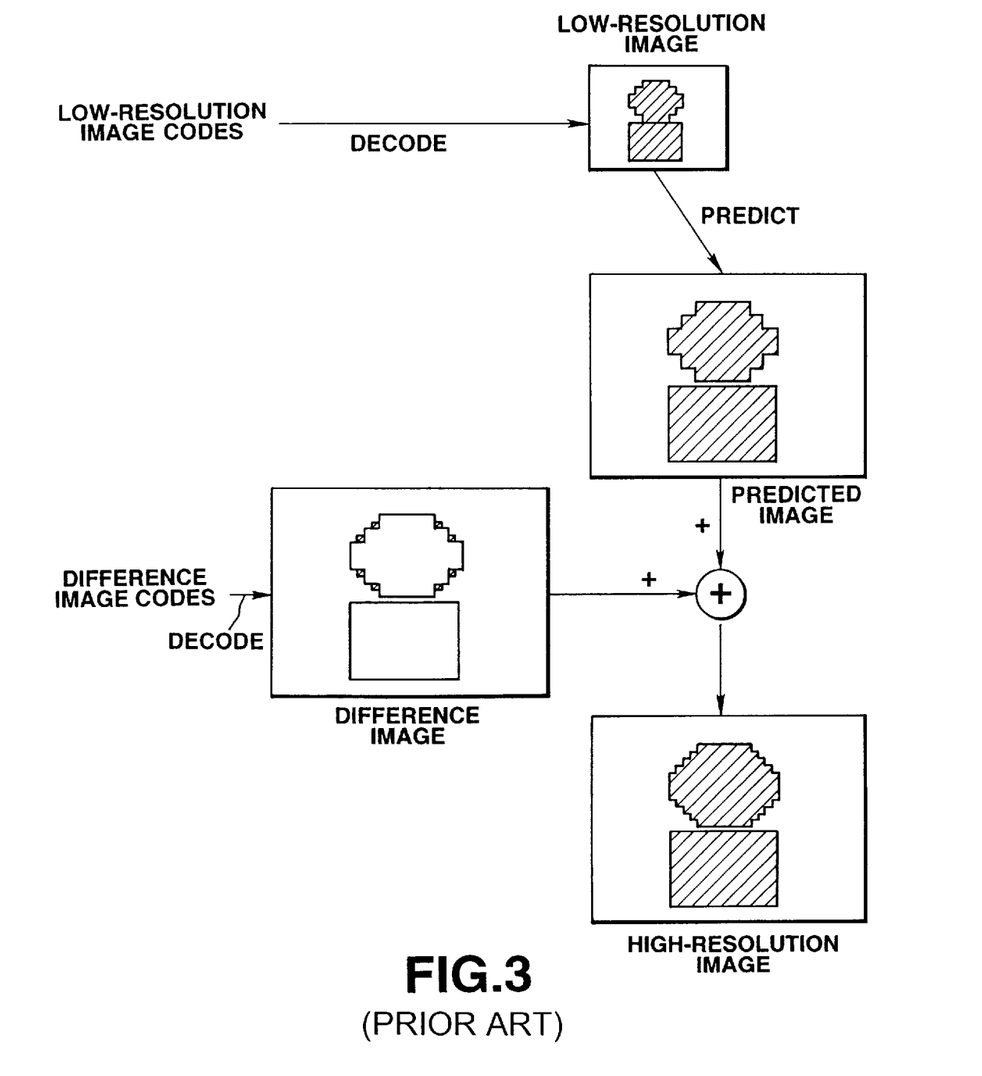
FIG. 3 is a view showing a method for decoding images of two resolutions.

In order to more efficiently encode the single bit stream than individually encode images having the respective resolutions, the prediction based on a low-resolution image is used for encoding a high-resolution image. As shown in FIG. 2, the encoding based on the prediction takes the steps of encoding a low-resolution image, predicting a high-resolution image from the low-resolution image, and encoding a difference between the predicted image and the high-resolution image. As shown in FIG. 3, the decoding side decodes only the part of the bit stream for composing the low-resolution image or all of the bit stream for composing the high-resolution image.

Figure 4:
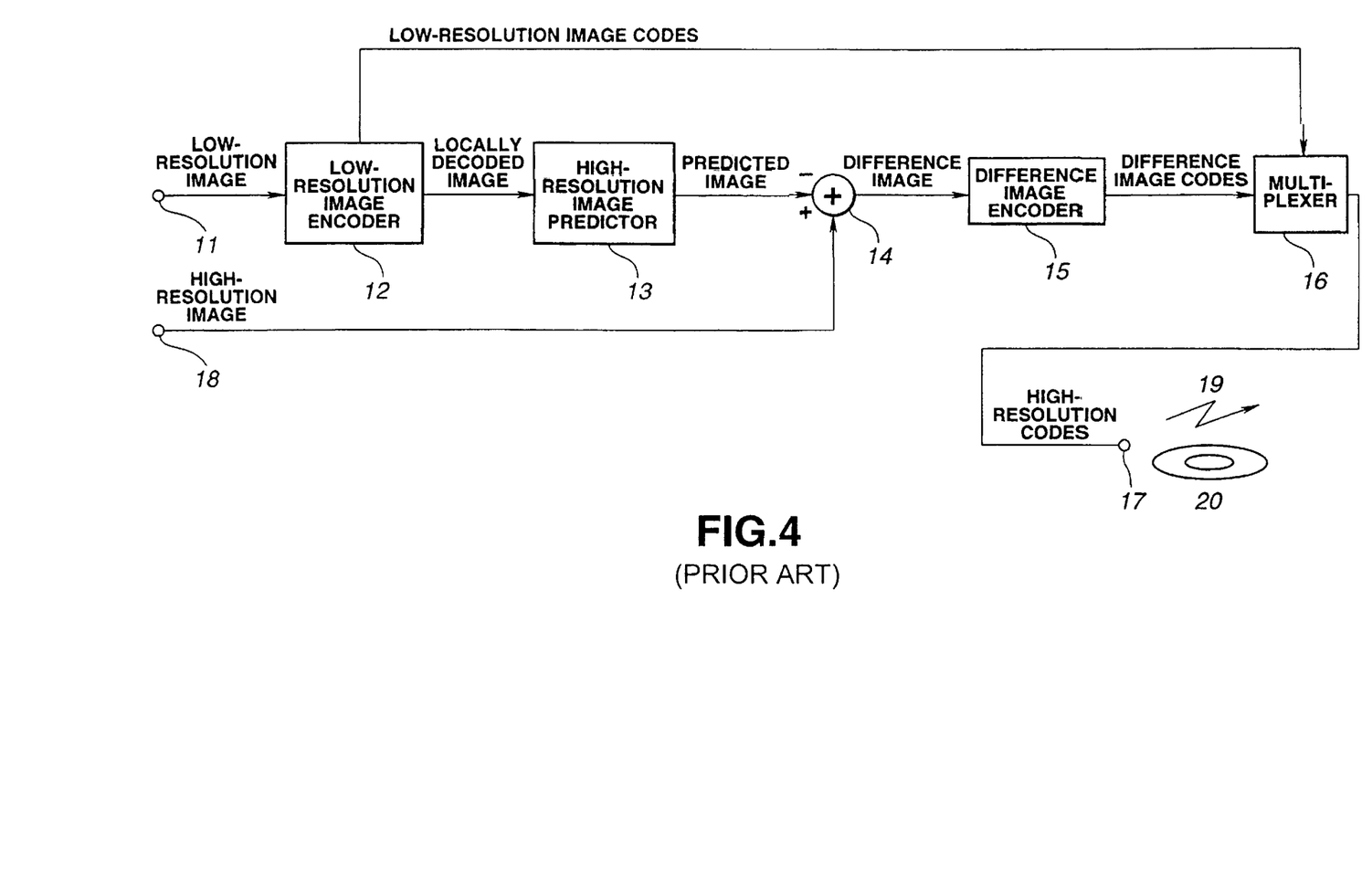
FIG. 4 is a block diagram showing an encoding unit for performing an encoding operation shown in FIG. 6.

The process shown in FIG. 2 is implemented by the encoding unit arranged as shown in FIG. 4. The encoding unit shown in FIG. 4 is inputted with the low-resolution image at a low-resolution image input terminal 11 or with the high-resolution image at a high-resolution image input terminal 18. Those inputted images are hierarchically encoded and then is outputted from a high-resolution image output terminal 17.

The image inputted at the low-resolution image input terminal 11 is encoded by a low-resolution image encoder 12 for generating the corresponding low-resolution image codes. The low-resolution image codes are locationally decoded. Then, a high-resolution image predictor 13 operates to predict the high-resolution image from the locally decoded image. The high-resolution image is sent to a difference calculator 14. The difference calculator 14 operates to calculate a difference between the predicted high-resolution image and the high-resolution image inputted at the high-resolution image input terminal 18. The difference is outputted as a difference image. The difference image codes generated by encoding the difference image through the difference image encoder 15 is multiplexed with the low-resolution image codes generated by the low-resolution image encoder 12 through a multiplexer 16. Then, the multiplexed codes are outputted from the high-resolution image output terminal 17.

Figure 5:
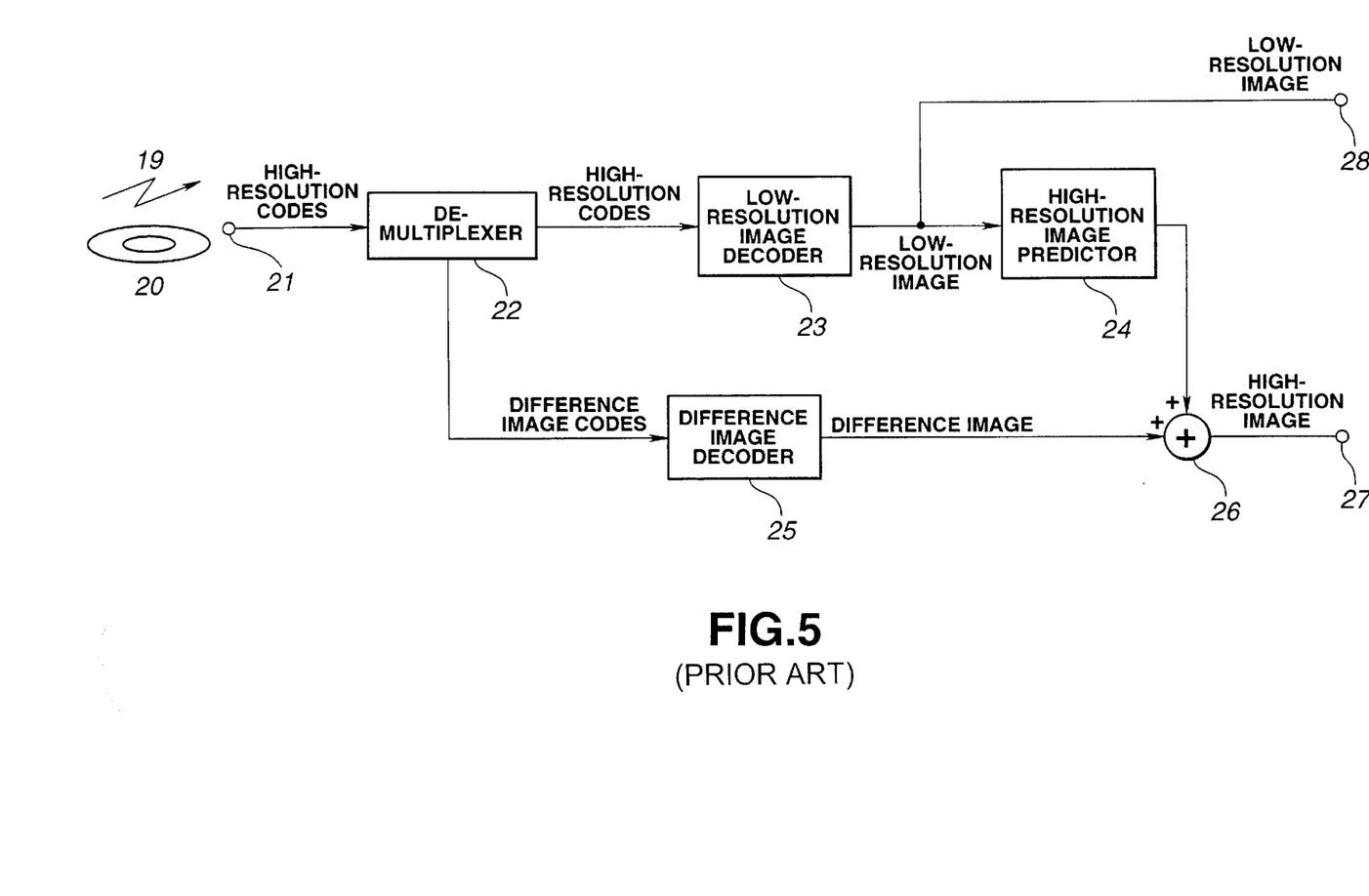
FIG. 5 is a block diagram showing a decoding unit for performing a decoding operation shown in FIG. 7.

The process shown in FIG. 12 is implemented by a decoding unit arranged as shown in FIG. 5. The decoding unit shown in FIG. 5 operates to decode the high-resolution image hierarchical codes to be inputted at a high-resolution image code input terminal 21 and then output the low-resolution image at a low-resolution image output terminal 28 and the high-resolution image at a high-resolution image output terminal 27.

The high-resolution image hierarchical codes inputted at the high-resolution image code input terminal 21 is de-multiplexed by a de-multiplexer 22 so that those codes are separated into the low-resolution image codes and the difference image codes. The low-resolution image codes are decoded by a decoder 23. If a user wants to watch the low-resolution image, the decoded image is outputted at a low-resolution image output terminal 28. If a user wants to watch the high-resolution image, the low-resolution image codes are sent to a high-resolution image predictor 24. The predictor 24 operates to predict the high-resolution image from the low-resolution image. The predicted image is sent to an adder 26. The adder 26 operates to add the predicted image to the difference image decoded by the difference image codes for composing the high-resolution image. The high-resolution image is outputted at the high-resolution image output terminal 27.

In general, the high-resolution image predictor 13 provided in the encoding unit shown in FIG. 4 and the high-resolution image predictor 24 provided in the decoding unit shown in FIG. 5 use a linear interpolating filter for doing their predictions.

As an example, the description will be oriented to the predicting method executed in the case of compressing a low-resolution image and a high-resolution image whose resolution is twice as numerous as the low-resolution image in width and length in combination. This predicting method is regulated by spatial scalability of the MPEG2 that is a method for compressing a moving picture.

Assuming that the horizontal number and the vertical number of pixels of the low-resolution image are denoted by H and W, respectively, therefore, the horizontal number and the vertical number of pixels of the high-resolution image are decoded by 2W and 2H, respectively.

Each pixel of the low-resolution image is assumed as B(x, y) x={0, 1, ..., W−1}, and y={0, 1, ..., H−1}, while each pixel of the high-resolution image is assumed as U(x, y) x={0, 1, ..., 2W−1}, and y={0, 1, ..., 2H−1}.

Figure 6:
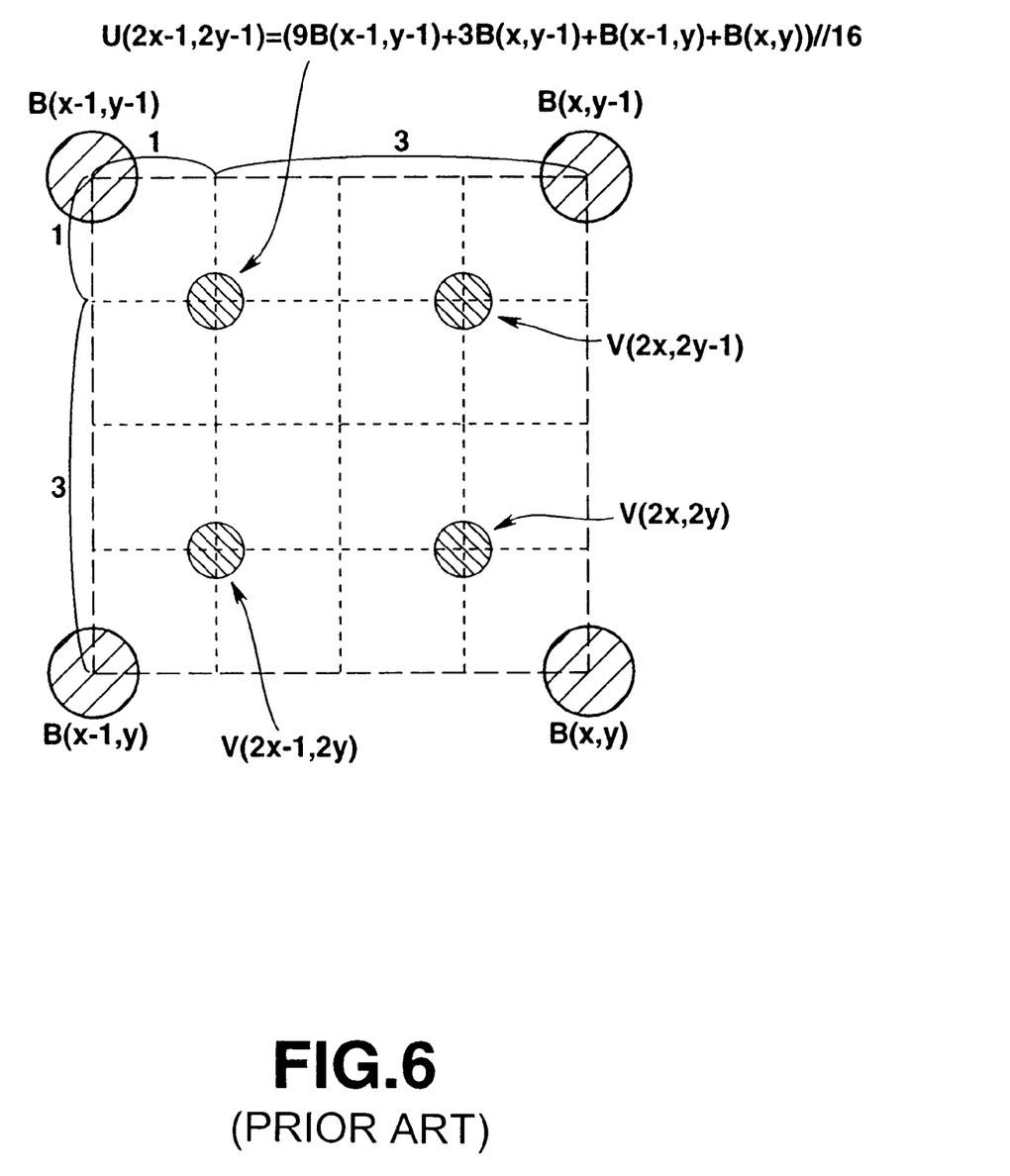
FIG. 6 is a view showing a phase relation of pixels between high-resolution and low-resolution images if a high resolution is twice as great as a low resolution.

The linear interpolating filter for predicting the high-resolution image from the low-resolution image is represented by the following expression 1. The phase relation of the pixels between the low-resolution image and the high-resolution image is represented by FIG. 6.

$$U(2x-1, 2y-1) = \\ (9B(x-1, y-1) + 3B(x-1, y) + 3B(x-1, y) + B(x, y,)) // 16$$

$$U(2x, 2y-1) = (3B(x-1, y-1) + \\ 9B(x, y-1) + B(x-1, y) + 3B(x, y)) // 16$$

$$U(2x-1, 2y) = (3B(x-1, y-1) + \\ B(x, (y-1) + 9B(x-1, y) + 3B(x, y)) // 16$$

$$U(2x, 2y) = (B(x-1, y-1) + 3B(x, y-1) + \\ 3B(x-1, y) + 9B(x, y)) // 16$$

expression 1 where // represents an operation of dividing a number and rounding it off to an integer.

In case no pixel exists outside an effective image area, such as B(−1, 0), the nearest effective pixel value thereto is taken in place. That is, $$B(x, y) = B(X, Y)$$

$$0 \text{ (if } x < 0)$$

$$X = x \text{ (if } 0 \leq x < W)$$

$$W - 1 \text{ (if } W \leq x)$$

$$0 \text{ (if } y < 0)$$

$$Y = y \text{ (if } 0 \leq y < H)$$

$$H - 1 \text{ (if } H \leq y)$$

Figure 7:
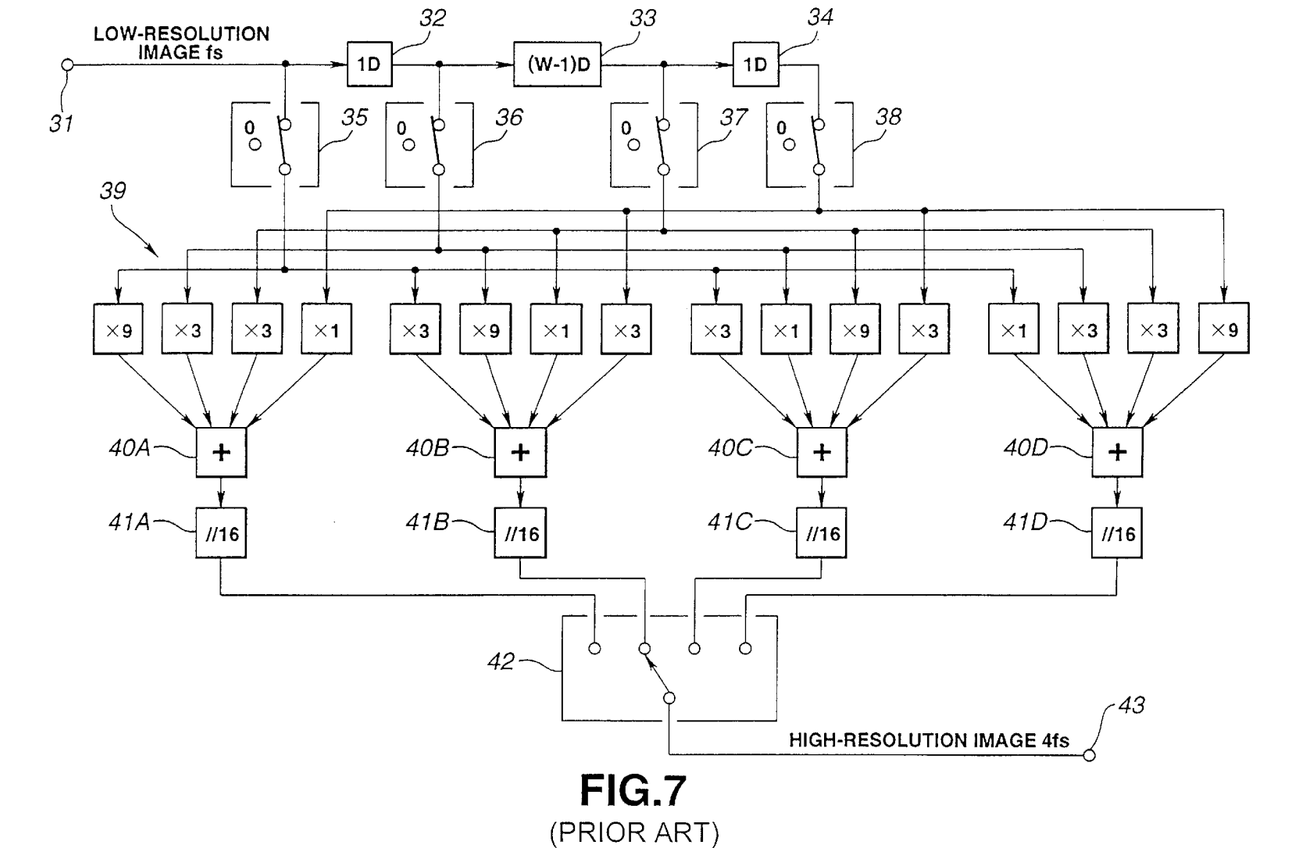
FIG. 7 is a block diagram showing a predictor for predicting a high-resolution image that is twice as great as a basic low-resolution image for prediction.

The foregoing process shown in FIG. 6 is implemented by a predictor arranged as shown in FIG. 7. That is, the high-resolution image predictor 13 provided in the encoding unit shown in FIG. 4 and the high-resolution image predictor 24 provided in the decoding unit shown in FIG. 5 are realized by the predictor shown in FIG. 7, respectively.

The predictor shown in FIG. 7 includes a plurality of delaying elements 32, 33, 34 whose delaying times are 1, W−1, and 1, respectively. The low-resolution image is applied from a low-resolution image input terminal 31 into selectors 35 to 38 through the delaying elements 32, 33 and 34. The selectors 35 to 38 are basically operated to directly output the pixel values sent from the delaying elements 32, 33 and 34. The terminals with "0" are used when the pixel value is located outside of an effective pixel range. The pixel values are weighted by a group of multiplexers 39 and then are added by adders 40A, 40B, 40C, and 40D. Then, those values are normalized by dividers 41A, 41B, 41C, and 41D and then are applied to the terminals of a selector 42. Since the outputted image have a double resolution rather than the inputted image in width and length, the number of the pixels of the outputted image is four times as great as that of the inputted image. Hence, assuming that the low-resolution image has a frequency of fs, the high-resolution image has a frequency of 4 fs. Each time one pixel of the image is inputted, the selector 42 operates to sequentially select four terminals and output the image at four times as high a frequency as the inputted image from a predicted high-resolution image output terminal 43.

The predicted high-resolution image is sequentially outputted every pair of lines. Hence, after the predicted high-resolution image is outputted from a predicted high-resolution image output terminal 43, those pairs of lines are rearranged by a sequence converter (not shown).

Figure 8:
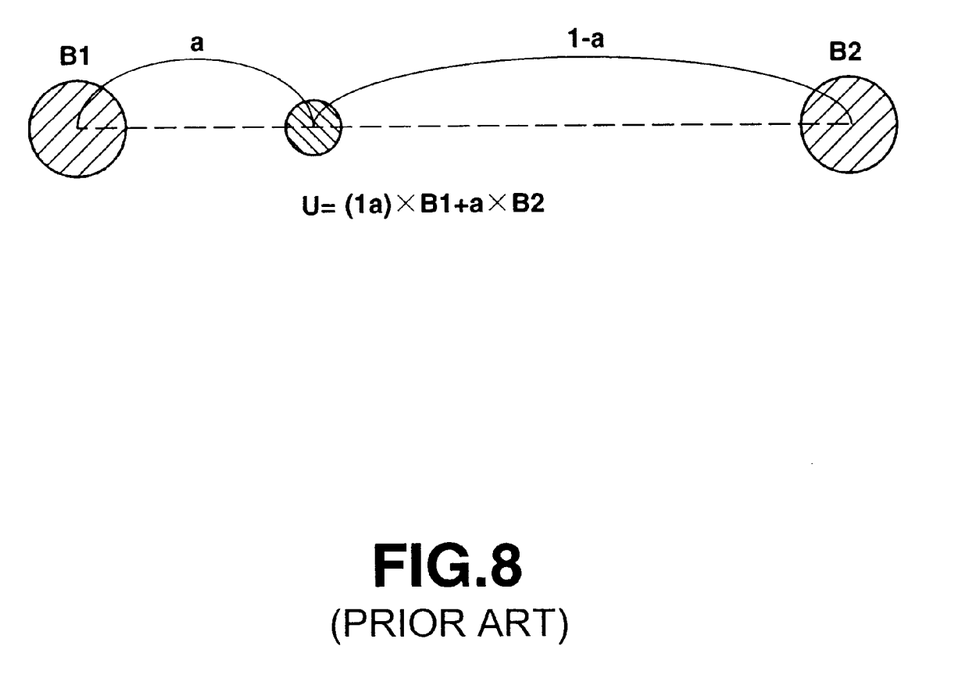
FIG. 8 is a view showing a method for predicting an image whose resolution is magnified at any value rather than a basic image for prediction.

The foregoing description has concerned with the case that the high-resolution image has twice as large a resolution as the low-resolution image in width and length. In general, the vertical or horizontal magnification may be any different value from each other. When the high-resolution pixel U to be predicted is located at an internally dividing point between the low-resolution pixels B1 and B2 at a ratio of a:(1−a), the value of the pixel U is predicted by the following expression 2. The phase relation of the pixels between the low-resolution image and the high-resolution image is represented by FIG. 8.

$$U = (1-a) \times B1 + a \times B2 \quad \text{expression 2}$$

The vertically and the horizontally one-dimensional interpolated results, both of which are independent of each other, are the pixel values of the predicted high-resolution image.

Figure 9:
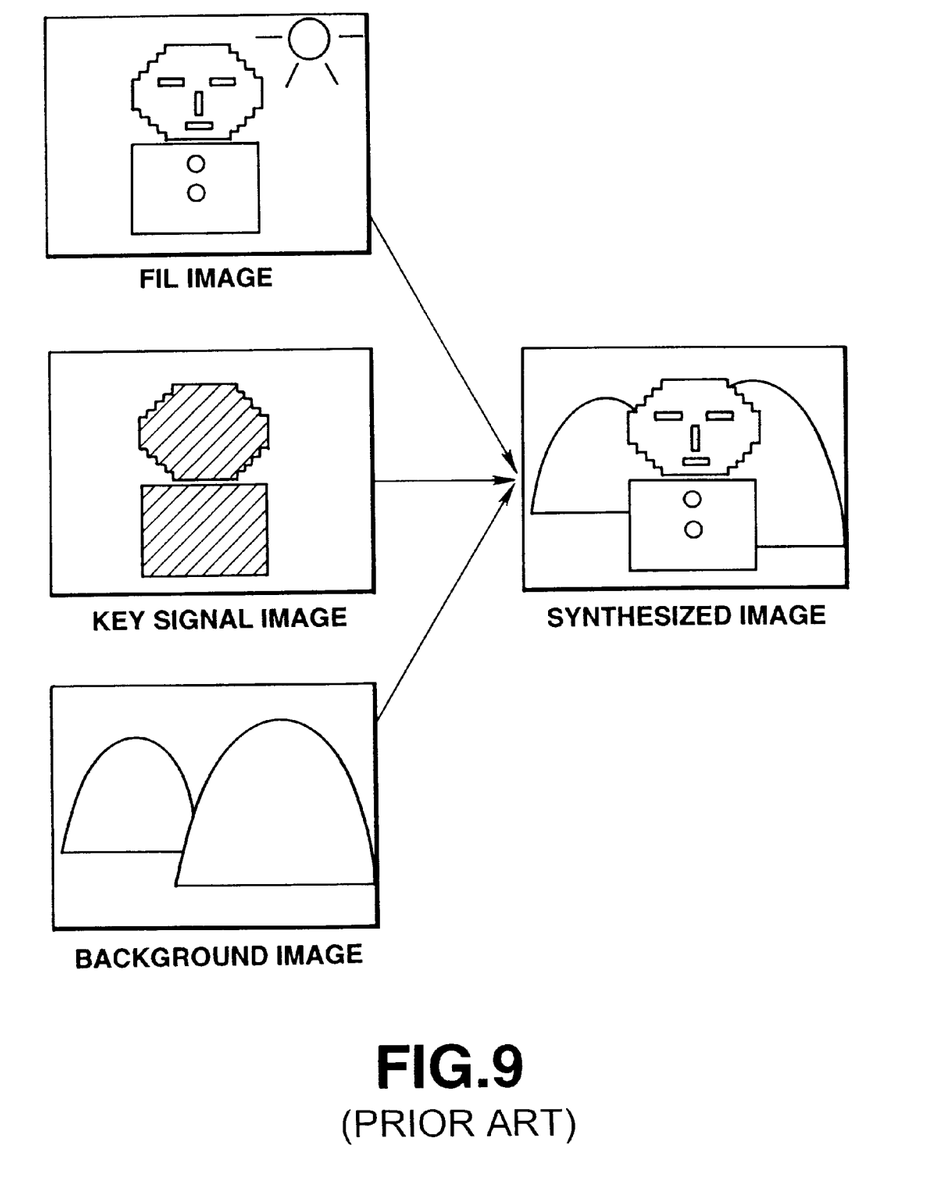
FIG. 9 is a view showing a method for encoding images of two resolutions with a key signal.

Further, one of the images to be encoded by this method is a key signal. The key signal represents a shape of an object by its interior or exterior. The object contained in the image is cut out along the shape and is synthesized with another background image. The image cut out by the key signal is termed a fil (see FIG. 9).

The key signal is categorized into a hard key and a soft key. The hard key is an binary image, which digitally represents the interior or the exterior of an object (with 1 and 0, for example). The soft key is a multi-valued (8-bit, for example) image, which represents the interior or the exterior of an object with a maximum value (255) or a minimum value (0) and represents a middle value between the pixel values of the object and the background with a medium value.

The foregoing method for predicting the high-resolution image from the low-resolution image is executed for the normal multi-valued image each pixel of which is represented by 8 bits or 10 bits. This predicting method has the following drawback.

That is, the calculation of each pixel of the high-resolution image needs as many as four pixel values. It means that this calculation is so complicated. Moreover, the calculation needs multiplications and additions. Further, when calculating a peripheral portion of the image, the exceptional process is required for avoiding the reference of the pixels outside of the effective image range.

In particular, in the case of applying this method to the soft key signal, an error takes place in lots of pixels because of the characteristics of the expression 1 served as a lowpass filter.

The present invention is made by overcoming the drawback and it is an object of the present invention to provide a method for predicting a high-resolution image based on a low-resolution image through a minimum process.

SUMMARY OF THE INVENTION

According to a first aspect of the invention, a method for encoding low-resolution data having a plurality of pixels and high-resolution data having a higher resolution than the low-resolution image, the high-resolution data having a plurality of pixels, includes: a first encoding step of encoding the low-resolution data, outputting the encoded low-resolution data, decoding the encoded low-resolution data, and outputting the decoded low-resolution data; a generating step of predicting the high-resolution data from the decoded low-resolution data and generating the predicted high-resolution data by repetitively outputting the pixels of the low-resolution data; and a second encoding step of encoding the high-resolution data based on the high-resolution data and the predicted high-resolution data and outputting the encoded high-resolution data.

According to a second aspect of the invention, a method for decoding the encoded data, the encoded data containing encoded low-resolution data having a plurality of pixels and encoded high-resolution data having a plurality of pixels, the high-resolution data having a higher resolution than the low-resolution data, includes: a receiving step of receiving the encoded data; a first decoding step of decoding the encoded low-resolution data and outputting the decoded low-resolution data; a predicting step of predicting the high-resolution data based on the decoded low-resolution data and generating the predicted high-resolution data by repetitively outputting the pixels of the low-resolution data; and a second decoding step of decoding the high-resolution data based on the encoded high-resolution data and the predicted high-resolution data and outputting the decoded high-resolution data.

According to a third aspect of the invention, an apparatus for encoding low-resolution data having a plurality of pixels and high-resolution data having a higher resolution than the low-resolution image, the high-resolution data having a plurality of pixels, includes: a first encoding unit for encoding the low-resolution data, outputting the encoded low-resolution data, decoding the encoded low-resolution data, and outputting the decoded low-resolution data; a generating unit for predicting the high-resolution data from the decoded low-resolution data and generating the predicted high-resolution data by repetitively outputting the pixels of the low-resolution data; and a second encoding unit for encoding the high-resolution data based on the high-resolution data and the predictive high-resolution data and outputting the encoded high-resolution data.

According to a fourth aspect of the invention, an apparatus for decoding the encoded data, the encoded data containing encoded low-resolution data having a plurality of pixels and encoded high-resolution data having a plurality of pixels, the high-resolution data having a higher resolution than the low-resolution data, includes: a receiving unit for receiving the encoded data; a first decoding unit for decoding the encoded low-resolution data and outputting the decoded low-resolution data; a predicting unit for predicting the high-resolution data based on the decoded low-resolution data and generating the predicted high-resolution data by repetitively outputting the pixels of the low-resolution data; and a second decoding unit for decoding the high-resolution data based on the encoded high-resolution data and the predicted high-resolution data and outputting the decoded high-resolution data.

According to a fifth aspect of the invention, a recording medium to be decoded by a decoding unit and for recording encoded data is provided, the encoded data being generated by: a first encoding step of encoding low-resolution data, outputting the encoded low-resolution data, decoding the encoded low-resolution data, and outputting said decoded low-resolution data; a predicting step of predicting high-resolution data based on the decoded low-resolution data and generating the predicted high-resolution data by repetitively outputting the pixels of the low-resolution data; and a second encoding step of encoding the high-resolution data based on the high-resolution data and the predicted high-resolution data and outputting the encoded high-resolution data.

According to a sixth aspect of the invention, a method for generating high-resolution data from low-resolution data, the high-resolution data having a higher resolution than the low-resolution data, includes the steps of: receiving the low-resolution data; and predicting the high-resolution data based on the low-resolution data and outputting the high-resolution data, the predicted high-resolution data generated by repetitively outputting the pixels of the low-resolution data.

According to a seventh aspect of the invention, an apparatus for generating high-resolution data from low-resolution data, the high-resolution data having a higher resolution than the low-resolution data, includes: a receiving unit for receiving the low-resolution data; and a predicting unit for predicting the high-resolution data based on the low-resolution data and outputting the high-resolution data, the predicted high-resolution data generated by repetitively outputting the pixels of the low-resolution data.

Further objects and advantages of the present invention will be apparent from the following description of the preferred embodiments of the invention as illustrated in the accompanying drawings.

BRIEF DESCRIPTION OF THE DRAWINGS

This and other objects, features and advantages of the present invention will become more apparent upon a reading of the following detailed description and drawings, in which.

DETAILED DESCRIPTION OF PREFERRED EMBODIMENTS

Later, the description will be oriented to a method for predicting an image and a method for encoding an image according to some preferred embodiments of the present invention with reference to the appended drawings.

Figure 10:
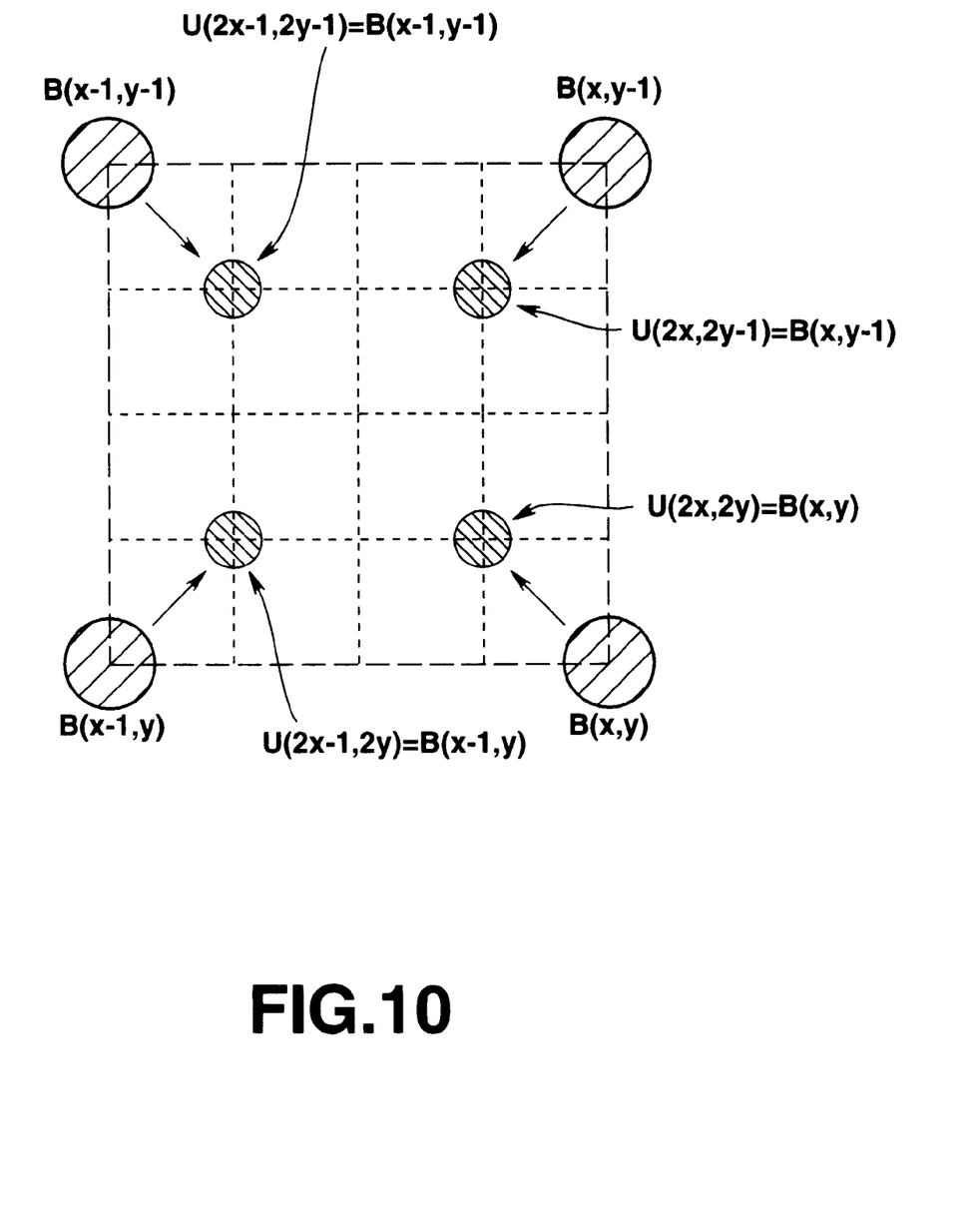
FIG. 10 is an explanatory view showing a method for predicting an image according to a first embodiment of the present invention.

At first, a first embodiment of the present invention will be described with reference to FIG. 10.

The first embodiment of the present invention is concerned with a method for predicting a high-resolution image based on a low-resolution image in the case that the high-resolution image has twice as great a resolution as the low-resolution image.

The method for predicting an image according to the present invention is executed to predict the high-resolution image on the low-resolution image by the following expression 3. The phase relation between the pixel B(x, y) of the low-resolution image and the pixel U(x, y) of the high-resolution image is represented in FIG. 10.

$$U(2x+i, 2y+j)=B(x, y) \qquad \text{expression 3}$$

wherein i, j={0, 1}, x={0, 1, . . . , $W$–1}, and y={0, 1, . . . , $H$–1}

Assuming that the number of the horizontal pixels of the low-resolution image is W and the number of the vertical pixels thereof is H, the number of the horizontal pixels of the high-resolution image is 2W and the number of the vertical pixels thereof is 2H.

Figure 11A:
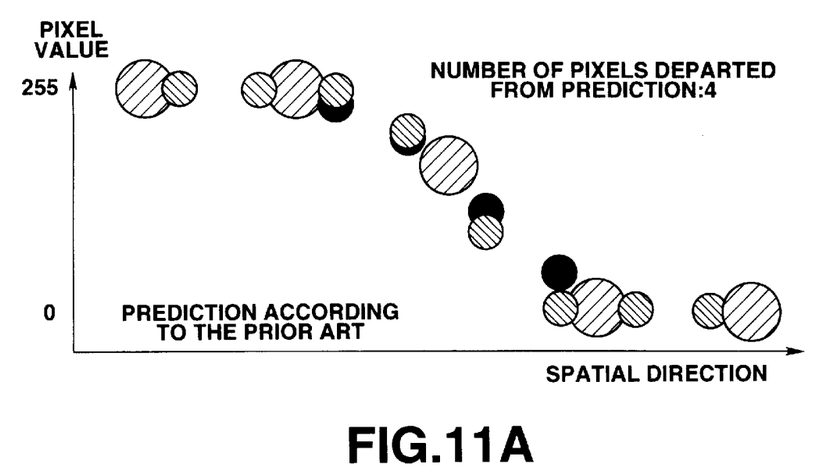
FIGS. 11A and 11B are graphs showing a prediction executed according to the first embodiment of the invention and a prediction executed according to the prior art.
Figure 11B:
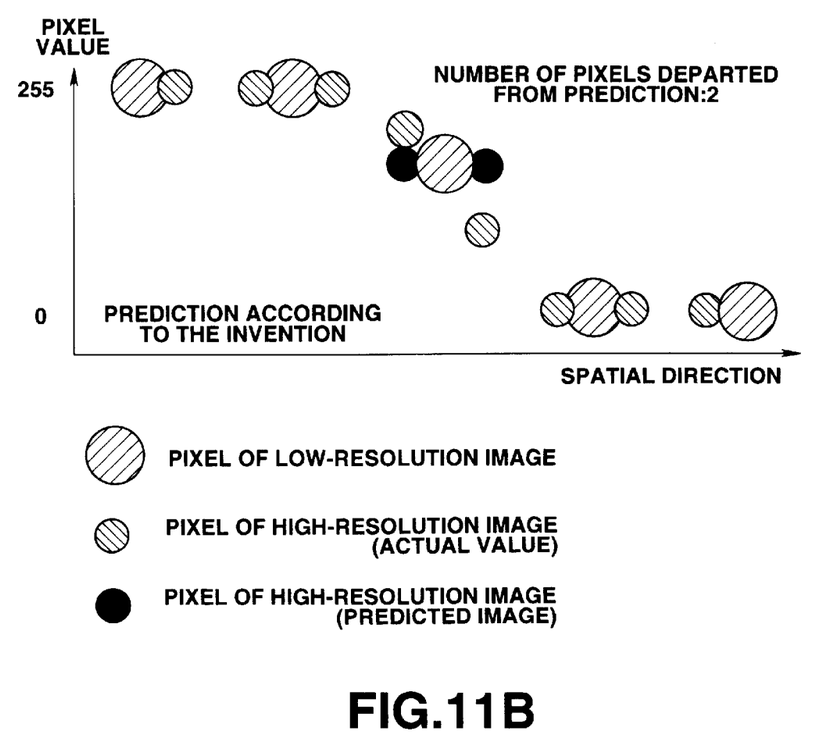

The method for predicting an image is arranged to double the pixel value of the low-resolution image in width and length for composing the high-resolution image. This method has the following advantages. That is, it needs only one pixel value of the low-resolution image required for calculating each pixel of the high-resolution image and does not need an arithmetic operation as well as an exceptional process of a peripheral portion of an image.

Where a binary image is to be processed, this embodiment offers an advantage of greatly simplifying the foregoing predicting process through the use of the prediction based on the expression 3 though the predicted image is quite same as the image given by the prior art. The process based on the expression 3 is executed to produce the same result as the process based on the expression 1. This is understood from the fact that the process represented by the expression 1 may be transformed into the following expression for the binary image.

$$U(2x, 2y)=B(x, y)$$
$$U(2x-1, 2y)=B(x-i, y)$$
$$U(2x, 2y-1)=B(x, y-1)$$
$$U(2x-1, 2y-1)=B(x-i, y-1)$$

Where a multi-valued image is to be processed, in addition to the foregoing advantage of greatly simplifying the foregoing predicting process, this embodiment offers another advantage of executing a high-precision prediction in a respect of defining the range where the erroneous pixels exist, in particular, for the soft key signal, as indicated in FIG. 11A showing the prediction of the prior art and in FIG. 11B showing the prediction of the present invention.

Figure 12:
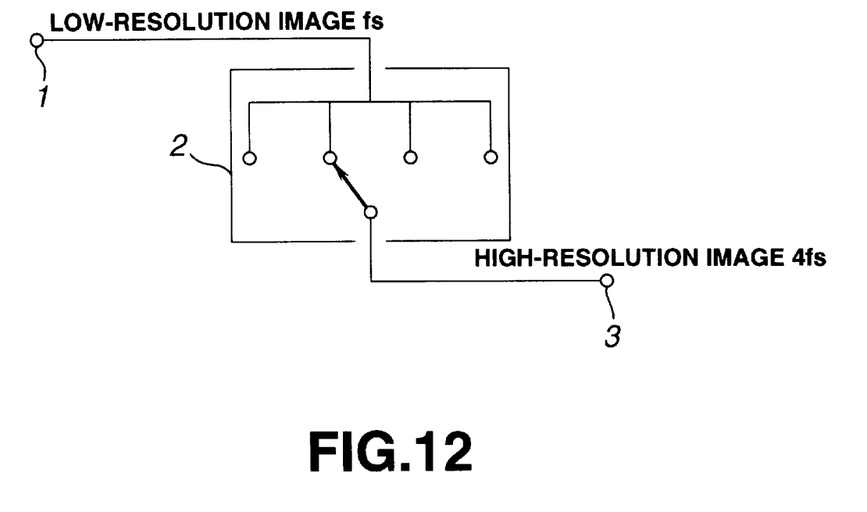
FIG. 12 is a diagram showing an arrangement of a predictor for realizing the method for predicting an image according to the first embodiment of the present invention.

The method for predicting an image according to the first embodiment of the present invention is realized by the predictor shown in FIG. 12. The predictor shown in FIG. 12 operates to predict the high-resolution image based on the low-resolution image inputted from the low-resolution input terminal 1 and output the predicted result at a predicted high-resolution output terminal 3.

The outputted image has twice as large a resolution as the inputted image in width and length. Hence, the outputted image contains four times as numerous as the inputted image. It means that assuming that the low-resolution image has a frequency of fs, the high-resolution image has a frequency of 4 fs.

The low-resolution image inputted at the low-resolution input terminal 1 is distributed into four terminals of a selector 2. Each terminal of the selector 2 is selected at four times as high a frequency as the inputted image and outputs the predicted high-resolution image at the predicted high-resolution image output terminal 3.

The predicted high-resolution image is sequentially outputted every pair of lines. Hence, after the image is outputted from the predicted high-resolution image output terminal 3, the pairs of lines are rearranged by a sequence converter (not shown).

Moreover, in the first embodiment, for the soft key signal, the predictive value obtained by the expression 1 of the prior art may be used if the predictive value obtained by the expression 3 is neither a maximum value (255 for an 8-bit image, for example) nor a minimum value (0 for an 8-bit image, for example). Though the processing amount is increased, this case offers a new advantage of decreasing a predictive residual.

In turn, the description will be oriented to a second embodiment of the present invention.

Figure 13:
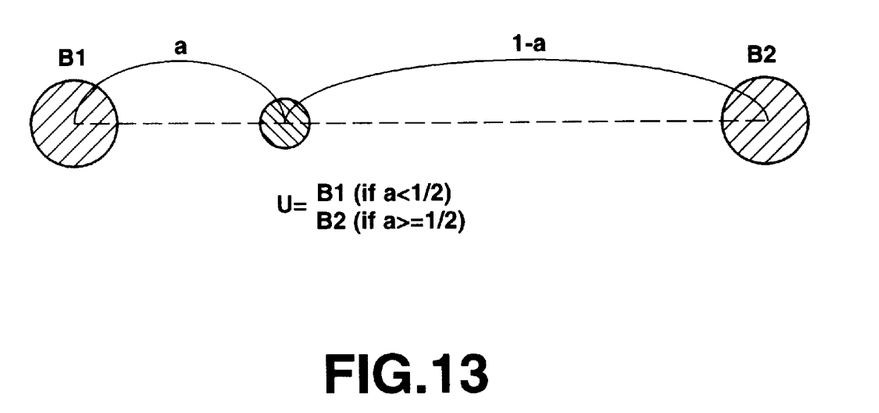
FIG. 13 is an explanatory view showing a method for encoding an image according to a second embodiment of the present invention.

In a case that the magnification of the vertical resolution of the low-resolution image against the high-resolution image is different from that of the horizontal resolution thereof, in place of the expression 2 of the prior art, the following expression 4 is used. That is, when a pixel U of the predicted high-resolution image is located at an internally dividing point between the low-resolution pixels B1 and B2 at a ratio of a:(1−a), the value of the pixel U is predicted by the following expression. The phase relation between the pixels of the high-resolution image and those of the low-resolution image is represented in FIG. 13

$$U=B1 (\text{if } a<½)$$
$$B2 (\text{if } ½<=a) \quad \text{expression 4}$$

Where a binary image is to be processed, if the internally dividing calculation of the prior art is replaced with a copy of the values represented by the expression 4, the foregoing process holds true to this image except that the output of the expression 4 is "0" and the filtering output of the expression 2 of the prior art is "1" in the case of a=½ and B1=1 and B2=0. The second embodiment offers an advantage of greatly simplifying the process as keeping the same performance of the predicted image as the first embodiment except that the predicted image is different in the case of a=½, B1=1, and B2=0.

Where a multi-valued image is to be processed, the second embodiment has an advantage of defining a range where errors are spread in addition to greatly simplifying the predicting process like the first embodiment.

In turn, the description will be oriented to a third embodiment of the present invention.

The compressing technique, MPEG 2, for a moving picture is arranged to predict the low-resolution image from the frames before and after the image as usual and a high-resolution image from the frames before and after the image as well as the low-resolution image when encoding moving pictures whose spatial resolutions are different from each other at a time.

When the low-resolution image is used for predicting the high-resolution image, as described with respect to the relevant technique, the encoder shown in FIG. 4 and the decoder shown in FIG. 5 are used for this purpose. (The process is executed within the frame for simplifying the process.)

According to the present invention, the predictor shown in FIG. 12 according to the first embodiment is used for the high-resolution image predictor 3 shown in FIG. 4 and the high-resolution image predictor 4 shown in FIG. 5. This predictor shown in FIG. 12 makes it possible to simplify the process of encoding the moving picture hierarchically according to the image resolution.

The method according to this invention makes it possible to predict and encode the hard key signal of a binary moving picture through the simpler process than the prior art and predict and encode the soft key signal of a multi-valued moving picture through the simpler process than the prior art as reducing the possibly erroneous pixels in number.

As set forth above, the present invention is capable of predicting the high-resolution image based on the low-resolution image through the simpler process.

Further, the method for predicting an image according to the present invention needs just one pixel for calculating each pixel of the high-resolution image. The prediction does not need an arithmetic operation but needs only copying the pixel values. Moreover, the exceptional process is not necessary for avoiding the use of the pixels located out of the effective image range. In addition, when treating the soft key signal, the method enables to define the range where the error is spread for enhancing the predictive accuracy.

The method for predicting an image according to the present invention is effective when combinationally compressing the moving pictures such as key signals having respective spatial resolutions.

Moreover, the embodiments of the inventions are implemented by the hardware as shown in the block diagrams. The present invention is not limited to the hardware. In actual, however, the present invention may be implemented by the software stored in a memory and executed by the CPU. Hence, the image encoding and/or decoding algorithms of the present invention may be implemented by a computer program, that is, an image encoding program and/or image decoding program. In this case, the computer program is recorded in a recording medium such as a semiconductor memory or a disk when it is in use. Moreover, the image encoding program and/or image decoding program may be supplied to some units such as a terminal through a network.

The present invention may be transformed and applied in various forms without departing from the spirit of the present invention. The gist of the invention is not therefore limited to the foregoing embodiments.

What is claimed is:

1. A method for encoding low-resolution data having a plurality of pixels and high-resolution data having a higher resolution than said low-resolution data, said high-resolution data having a plurality of pixels, comprising the steps of:

encoding said low-resolution data, outputting said encoded low-resolution data, decoding said encoded low-resolution data, and outputting said decoded low-resolution data;

determining a pixel of said low-resolution data at a spatially nearest location to each pixel of said high-resolution data from a plurality of pixels of said low-resolution data;

predicting said high-resolution data based on said decoded low-resolution data and generating said predicted high-resolution data by outputting said determined pixel of said low-resolution data located at the spatially nearest location to each of said high-resolution data; and encoding said high-resolution data based on said high-resolution data and said predictive high-resolution data and outputting said encoded high-resolution data.

2. The method as claimed in claim 1, wherein a difference between said high-resolution data and said predicted high-resolution data is determined and said difference is encoded as said high-resolution encoded data.

3. A method for decoding encoded data, said encoded data containing encoded low-resolution data having a plurality of pixels and encoded high-resolution data having a plurality of pixels, said high-resolution data having a higher resolution than said low-resolution data, comprising the steps of:

receiving said encoded data;

decoding said encoded low-resolution data and outputting said decoded low-resolution data;

determining a pixel of said low-resolution data at a spatially nearest location to each pixel of said high-resolution data from a plurality of pixels of said low-resolution data;

predicting said high-resolution data based on said decoded low-resolution data and generating said predicted high-resolution data by outputting said determined pixel of said low-resolution data located at the spatially nearest location to each of said high-resolution data; and decoding said high-resolution data based on said encoded high-resolution data and said predicted high-resolution data and outputting said decoded high-resolution data.

4. The method as claimed in claim 3, wherein said encoded high-resolution data is obtained by calculating a difference between said high-resolution data and said predicted high-resolution data generated when encoding said high-resolution data and encoding said difference data, said predicted high-resolution data generated in encoding said high-resolution data is obtained by repetitively outputting a pixel of said low-resolution data located at the spatially nearest location to each of said high-resolution data, and decoding said encoded high-resolution data and outputting said decoded difference data, and adding said difference data to said predicted high-resolution data and outputting said decoded high-resolution data.

5. An apparatus for encoding low-resolution data having a plurality of pixels and high-resolution data having a higher resolution than said low-resolution data said high-resolution data having a plurality of pixels, comprising:

a first encoding unit for encoding said low-resolution data, outputting said encoded low-resolution data, decoding said encoded low-resolution data, and outputting said decoded low-resolution data;

determining a pixel of said low-resolution data at a spatially nearest location to each pixel of said high-resolution data from a plurality of pixels of said low-resolution data;

a generating unit for predicting said high-resolution data based on said decoded low-resolution data and generating said predicted high-resolution data by outputting said determined pixel of said low-resolution data located at the spatially nearest location to each of said high-resolution data; and a second encoding unit for encoding said high-resolution data based on said high-resolution data and said predictive high-resolution data and outputting said encoded high-resolution data.

6. The apparatus as claimed in claim 5, wherein a difference between said high-resolution data and said predicted high-resolution data is determined and said difference is encoded as said high-resolution encoded data.

7. An apparatus for decoding encoded data, said encoded data containing encoded low-resolution data having a plurality of pixels and encoded high-resolution data having a plurality of pixels, said high-resolution data having a higher resolution than said low-resolution data, comprising:

a receiving unit for receiving said encoded data;

a first decoding unit for decoding said encoded low-resolution data and outputting said decoded low-resolution data;

a determining unit for determining a pixel of said low-resolution data at a spatially nearest location to each pixel of said high-resolution data from a plurality of pixels of said low-resolution data;

a predicting unit for predicting said high-resolution data based on said decoded low-resolution data and generating said predicted high-resolution data by outputting said determined pixel of said low-resolution data located at the spatially nearest location to each of said high-resolution data; and a second decoding unit for decoding said high-resolution data based on said encoded high-resolution data and said predicted high-resolution data and outputting said decoded high-resolution data.

8. The apparatus as claimed in claim 7, wherein said encoded high-resolution data is obtained by calculating a difference between said high-resolution data and said predicted high-resolution data generated when encoding said high-resolution data and encoding said difference data, said predicted high-resolution data generated in encoding said high-resolution data is obtained by repetitively outputting the pixels of said low-resolution data, and said second decoding unit includes a unit for decoding said encoded high-resolution data and outputting said decoded difference data and another unit for adding said difference data to said predicted high-resolution data and outputting said decoded high-resolution data.

9. A recording medium comprising codes for performing the steps of:

encoding low-resolution data, outputting said encoded low-resolution data, decoding said encoded low-resolution data, and outputting said decoded low-resolution data;

determining a pixel of said low-resolution data at a spatially nearest location to each pixel of said high-resolution data from a plurality of pixels of said low-resolution data;

predicting high-resolution data based on said decoded low-resolution data and generating said predicted high-resolution data by outputting said determined pixel of said low-resolution data located at the spatially nearest location to each of said high-resolution data; and encoding said high-resolution data based on said high-resolution data and said predicted high-resolution data and outputting said encoded high-resolution data.

10. The recording medium as claimed in claim 9 wherein a difference between said high-resolution data and said predicted high-resolution data is determined and said difference is encoded as said high-resolution encoded data.

* * * * *